(12) United States Patent
Nakamura et al.

(10) Patent No.: US 12,236,298 B2
(45) Date of Patent: Feb. 25, 2025

(54) DISPLAY CONTROL DEVICE, DISPLAY CONTROL SYSTEM, DISPLAY CONTROL METHOD, AND RECORDING MEDIUM

(71) Applicant: NEC Corporation, Tokyo (JP)

(72) Inventors: Junya Nakamura, Tokyo (JP); Daisuke Kawasaki, Tokyo (JP); Kaori Yamane, Tokyo (JP)

(73) Assignee: NEC CORPORATION, Tokyo (JP)

( * ) Notice: Subject to any disclaimer, the term of this patent is extended or adjusted under 35 U.S.C. 154(b) by 32 days.

(21) Appl. No.: 18/122,223

(22) Filed: Mar. 16, 2023

(65) Prior Publication Data

US 2023/0306221 A1   Sep. 28, 2023

(30) Foreign Application Priority Data

Mar. 28, 2022 (JP) .................. 2022-051681

(51) Int. Cl.
*G06K 19/06* (2006.01)
*B61D 33/00* (2006.01)
*B61L 15/00* (2006.01)

(52) U.S. Cl.
CPC ... *G06K 19/06037* (2013.01); *B61D 33/0007* (2013.01); *B61L 15/009* (2013.01)

(58) Field of Classification Search
CPC ............. G06K 19/06037; B61D 33/0007
USPC ........................................... 235/494
See application file for complete search history.

(56) References Cited

U.S. PATENT DOCUMENTS

| 8,526,922 B1* | 9/2013 | Koster | H04N 1/00326 |
| | | | 455/414.1 |
| 9,355,396 B1* | 5/2016 | Alkasimi | H04L 67/12 |
| 2012/0181329 A1* | 7/2012 | Gratton | G06F 16/00 |
| | | | 235/375 |
| 2013/0095807 A1* | 4/2013 | Bhaumik | H04M 3/51 |
| | | | 455/417 |
| 2013/0203439 A1* | 8/2013 | Lifshitz | G06Q 50/01 |
| | | | 455/456.2 |
| 2014/0282684 A1* | 9/2014 | Keen | H04N 7/18 |
| | | | 725/30 |
| 2015/0090784 A1* | 4/2015 | Petaia | G16H 10/60 |
| | | | 235/494 |
| 2015/0281628 A1* | 10/2015 | Lev | H04N 1/00244 |
| | | | 348/838 |
| 2016/0078335 A1* | 3/2016 | Annamalai | G06T 11/60 |
| | | | 382/284 |
| 2016/0205554 A1* | 7/2016 | Cagle | H04W 12/08 |
| | | | 455/411 |
| 2017/0034176 A1* | 2/2017 | Qi | H04W 4/21 |
| 2017/0054846 A1* | 2/2017 | Dervan | H04M 7/003 |
| 2018/0218124 A1* | 8/2018 | Gorelick | G16H 10/65 |
| 2019/0138205 A1* | 5/2019 | Wu | G06F 3/04883 |

(Continued)

FOREIGN PATENT DOCUMENTS

| JP | 2015-144381 A | 8/2015 |
| JP | 2020-116990 A | 8/2020 |

*Primary Examiner* — Allyson N Trail
(74) *Attorney, Agent, or Firm* — Sughrue Mion, PLLC

(57) ABSTRACT

A display control method includes: acquiring information indicating a contact point of an attendant in a train from a management device storing the information indicating the contact point of the attendant in the train; and transmitting information for causing a display device in the train to display a two-dimensional code based on the acquired information.

5 Claims, 11 Drawing Sheets

(56) References Cited

U.S. PATENT DOCUMENTS

| | | | |
|---|---|---|---|
| 2021/0049724 A1* | 2/2021 | Morris | G06K 19/06037 |
| 2022/0366448 A1* | 11/2022 | Doumar | G06Q 30/01 |
| 2022/0394430 A1* | 12/2022 | Lowenberg | H04W 4/24 |
| 2023/0133569 A1* | 5/2023 | Kadry | G06Q 20/363 |
| | | | 705/39 |
| 2023/0164731 A1* | 5/2023 | Holland | H04W 64/00 |
| 2023/0312104 A1* | 10/2023 | Pajic | B64D 11/00152 |
| | | | 244/118.5 |
| 2023/0354041 A1* | 11/2023 | Termanini | H04L 63/0853 |

* cited by examiner

DISPLAY CONTROL DEVICE, DISPLAY CONTROL SYSTEM, DISPLAY CONTROL METHOD, AND RECORDING MEDIUM

This application is based upon and claims the benefit of priority from Japanese Patent Application No. 2022-051681, filed on Mar. 28, 2022, the disclosure of which is incorporated herein in its entirety by reference.

TECHNICAL FIELD

The present invention relates to a display control device, a display control system, a display control method, and a recording medium.

BACKGROUND ART

In recent years, an attendant carries a service terminal while working. Therefore, when a passenger can notify an emergency from a mobile terminal to the service terminal of the attendant, the passenger can notify the emergency while moving or at any place. There is a method of contacting a predetermined contact point by using a two-dimensional code including information indicating the contact point.

JP 2015-144381 A describes that a vehicle device displays a QR code (registered trademark) (Quick Response code) indicating an address of an information center on a display of the vehicle device. In the method described in JP 2015-144381 A, the mobile terminal accesses the information center using the address acquired from the QR code.

JP 2020-116990 A describes that a notification device displays a QR code including a phone number of an administrator of a vehicle on a display visible from the outside of the vehicle, for an occupant of another vehicle colliding with the vehicle, a person who is accidentally around the vehicle when the vehicle causes an accident or the like.

SUMMARY

An example object of the invention is to provide a display control device, a display control system, a display control method, and a recording medium that enable a display device to display a two-dimensional code corresponding to a change in contact point.

In an example aspect of the invention, a display control device includes: an acquisition unit that acquires information indicating a contact point of an attendant in a train from a management device storing the information indicating the contact point of the attendant in the train; and a transmission unit that transmits information for causing a display device in the train to display a two-dimensional code based on the acquired information.

In an example aspect of the invention, a display control method includes: acquiring information indicating a contact point of an attendant in a train from a management device storing the information indicating the contact point of the attendant in the train; and transmitting information for causing a display device in the train to display a two-dimensional code based on the acquired information.

In an example aspect of the invention, a recording medium records thereon a display control program for causing a computer to execute: acquiring information indicating a contact point of an attendant in a train from a management device storing the information indicating the contact point of the attendant in the train; and transmitting information for causing a display device in the train to display a two-dimensional code based on the acquired information.

BRIEF DESCRIPTION OF THE DRAWINGS

Exemplary features and advantages of the present invention will become apparent from the following detailed description when taken with the accompanying drawings in which.

EXAMPLE EMBODIMENT

First Example Embodiment

Figure 1:
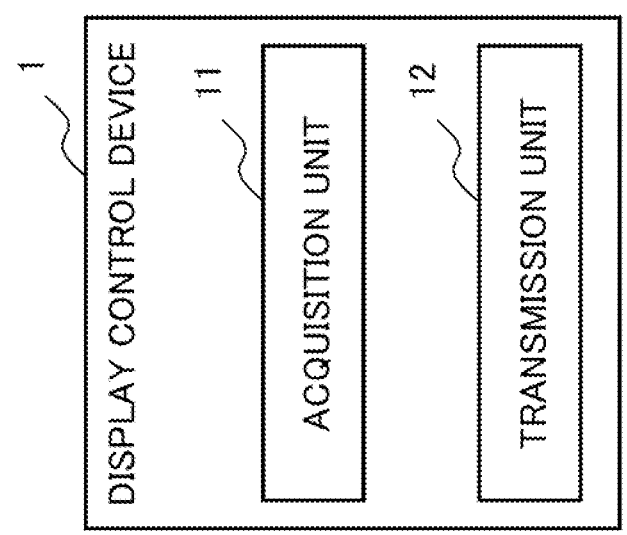
FIG. 1 is a block diagram illustrating an example of a configuration of a display control device according to a first example embodiment of the present invention.
Figure 2:
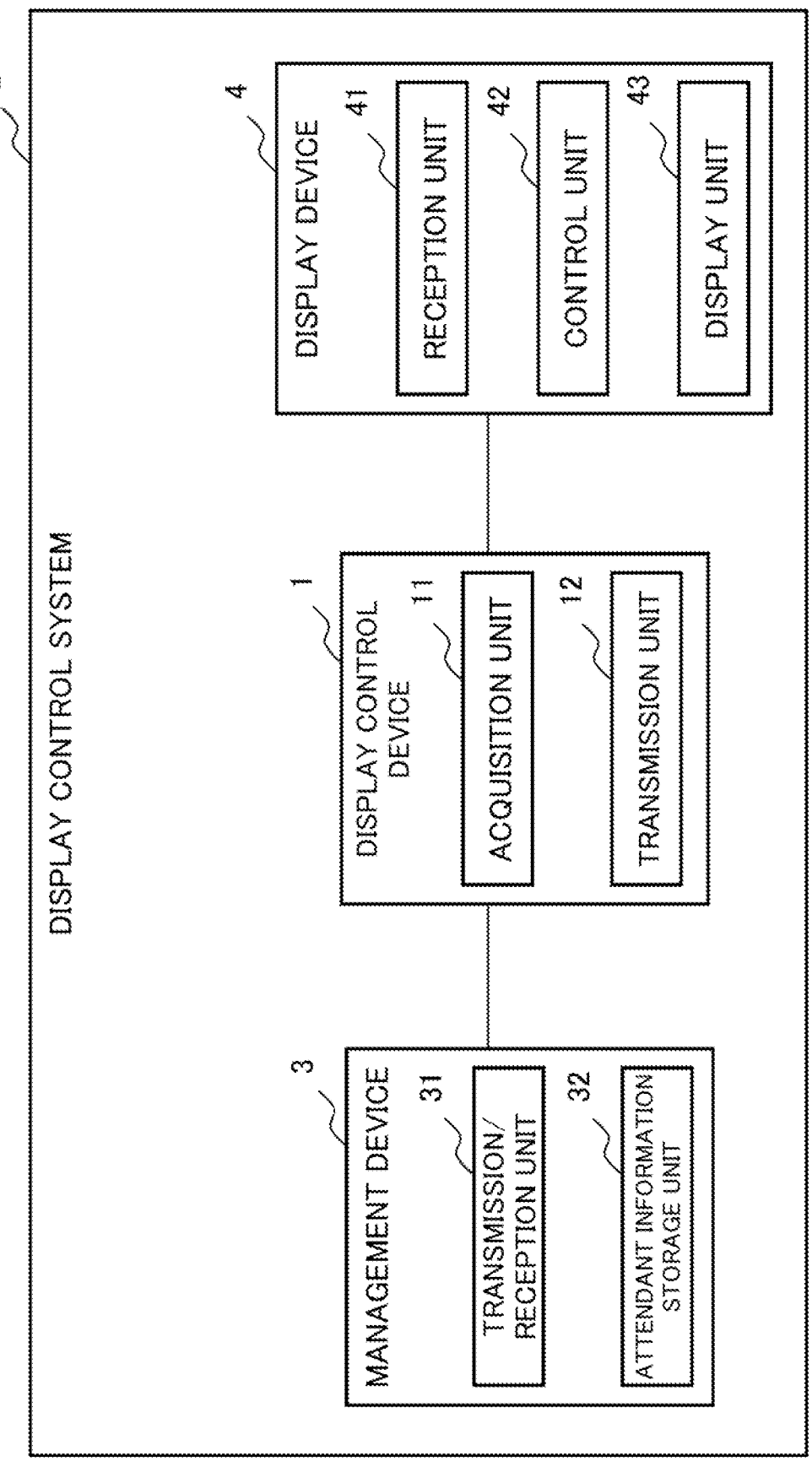
FIG. 2 is a block diagram illustrating an example of a configuration of a display control system according to the first example embodiment of the present invention.

A first example embodiment of the present invention will be described. FIG. 1 is a block diagram illustrating an example of a configuration of a display control device 1 according to the present example embodiment. FIG. 2 is a block diagram illustrating an example of a configuration of a display control system 2 according to the present example embodiment.

The display control system 2 includes a display control device 1, a management device 3, and a display device 4.

Figure 6:
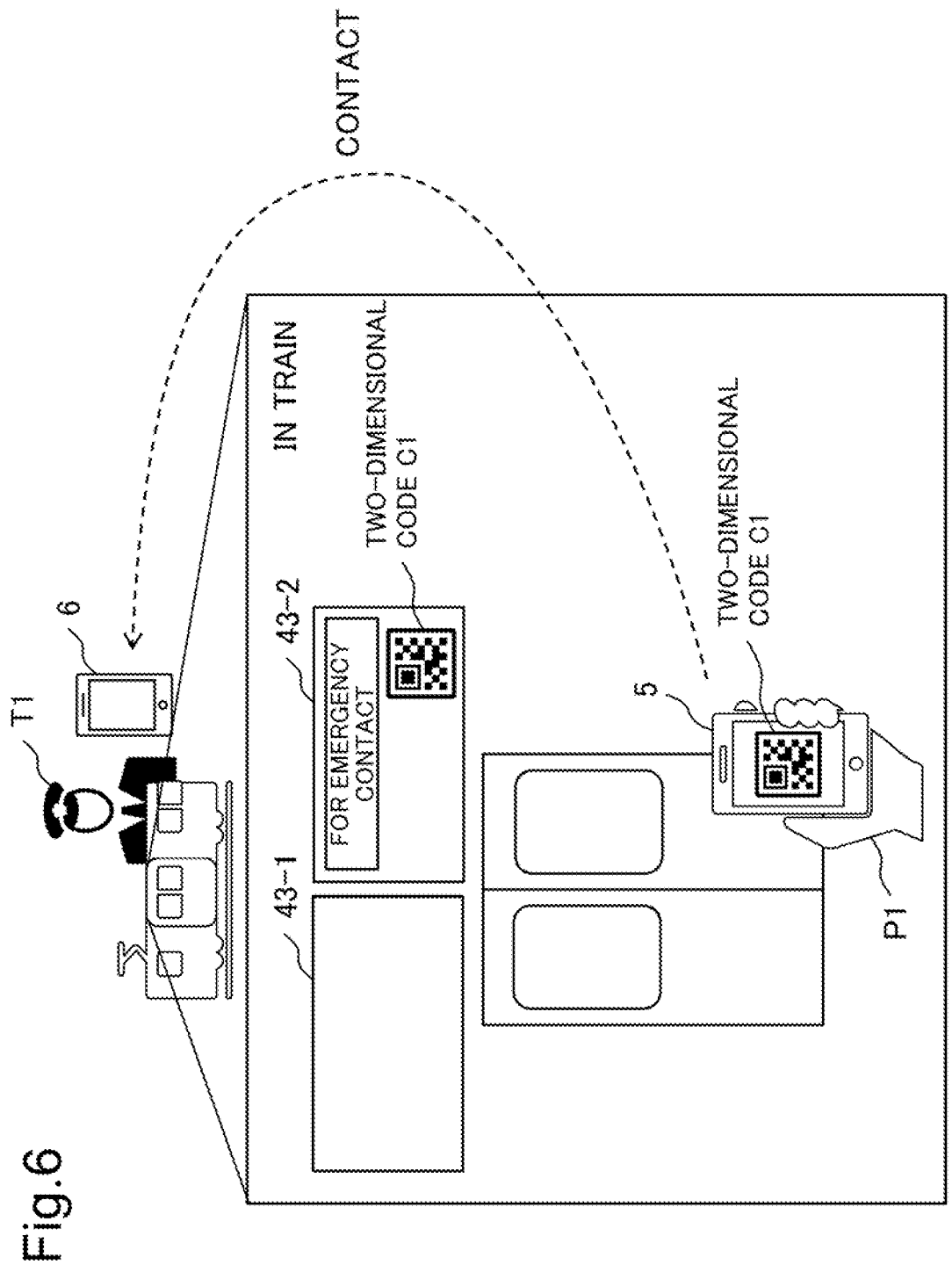
FIG. 6 is a schematic diagram illustrating how a passenger contacts an attendant when the display control system according to the first example embodiment of the present invention is used.

In an attendant information storage unit 32 of the management device 3, information indicating a contact point of an attendant in a train is stored in advance. The management device 3 is included in, for example, an operation management system that manages an operation of the train. For example, the management device 3 is a server provided outside the train. For example, in the information indicating the contact point, a phone number of a terminal 6, which is a terminal carried by an attendant who is working, is indicated as a contact point of the attendant. The terminal 6 is illustrated in FIG. 6 to be described below. For example, the terminal 6 is a smartphone or a tablet terminal. The terminal 6 may be a stationary terminal installed in the train.

The display control device 1 acquires information indicating the contact point of the attendant in the train from the management device 3, and transmits information for causing the display device 4 in the train to display a two-dimensional code. The transmission destination may be the display device 4 including a display unit 43 that displays a two-dimensional code, or may be a central device (not illustrated) of the train. The display control device 1 causes the display device 4 in the train to display a two-dimensional code according to a result of registration in the management device 3. The central device controls the display of the display device 4 installed in the train. One or more display devices 4 are installed in the train. For example, the central device receives content information distributed from a content distribution system (not illustrated) that distributes content such as an advertisement, and controls the display of the display device 4. The content information will be described below. The display control device 1 may be installed inside the train, or may be installed outside the train. For example, the display control device 1 outside the train may transmit information for causing the display device 4 in the train to display a two-dimensional code to the central device, thereby controlling the display of the display device 4 indirectly via the central device. Alternatively, the central device and the display control device 1 may be achieved by one information processing device. Specifically, the display control device 1 may have functions of the central device. Note that the management device 3 and the display control device 1 may be achieved by one information processing device.

Figure 3:
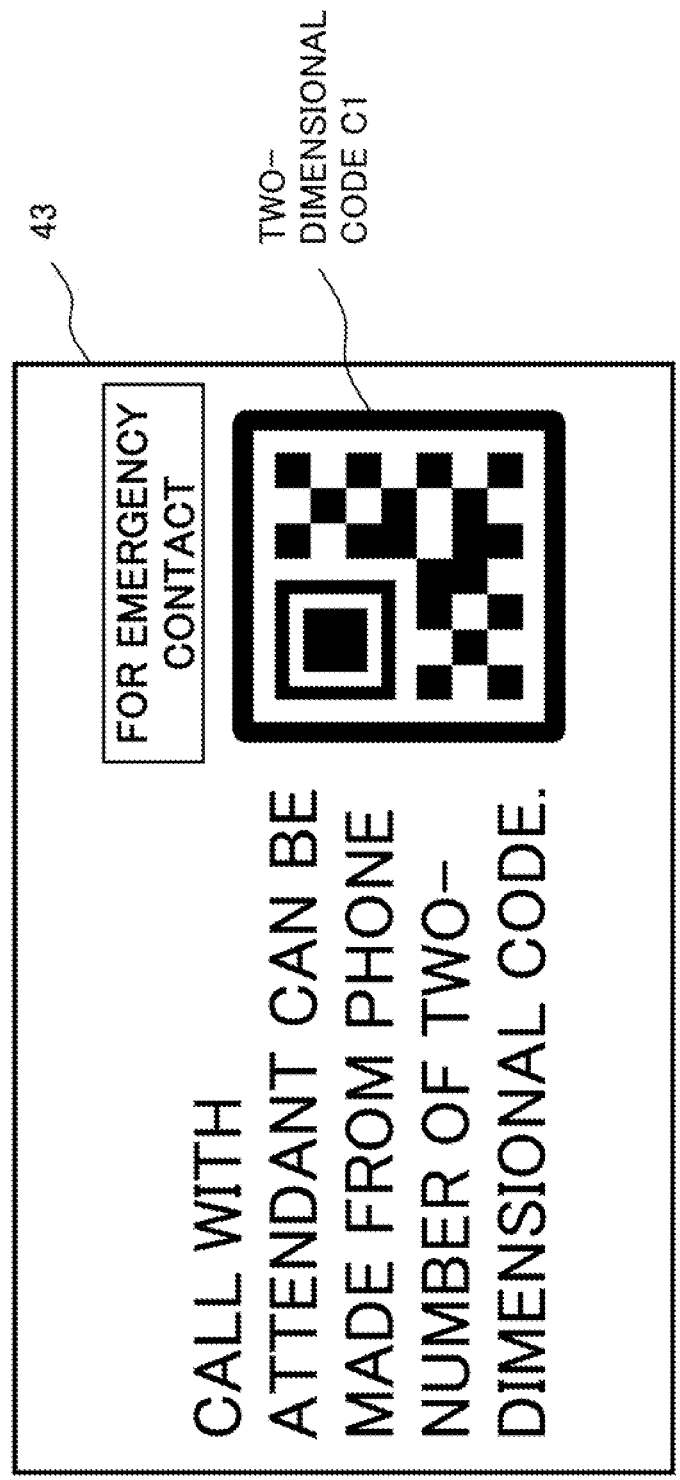
FIG. 3 is a diagram illustrating an example of an image displayed on a display unit of a display device according to the first example embodiment of the present invention.
Figure 4:
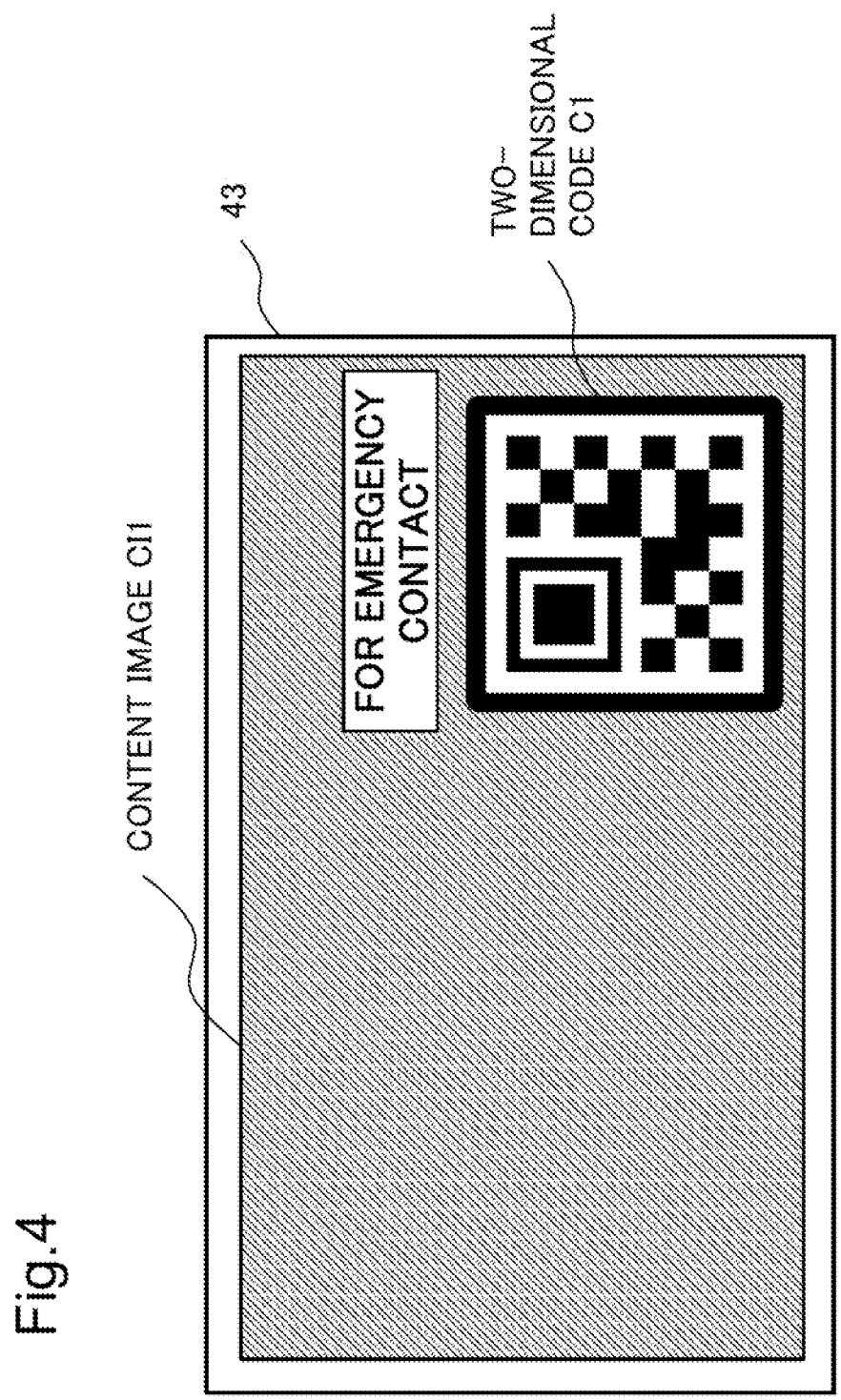
FIG. 4 is a diagram illustrating an example of an image displayed on a display unit of a display device according to the first example embodiment of the present invention.
Figure 5:
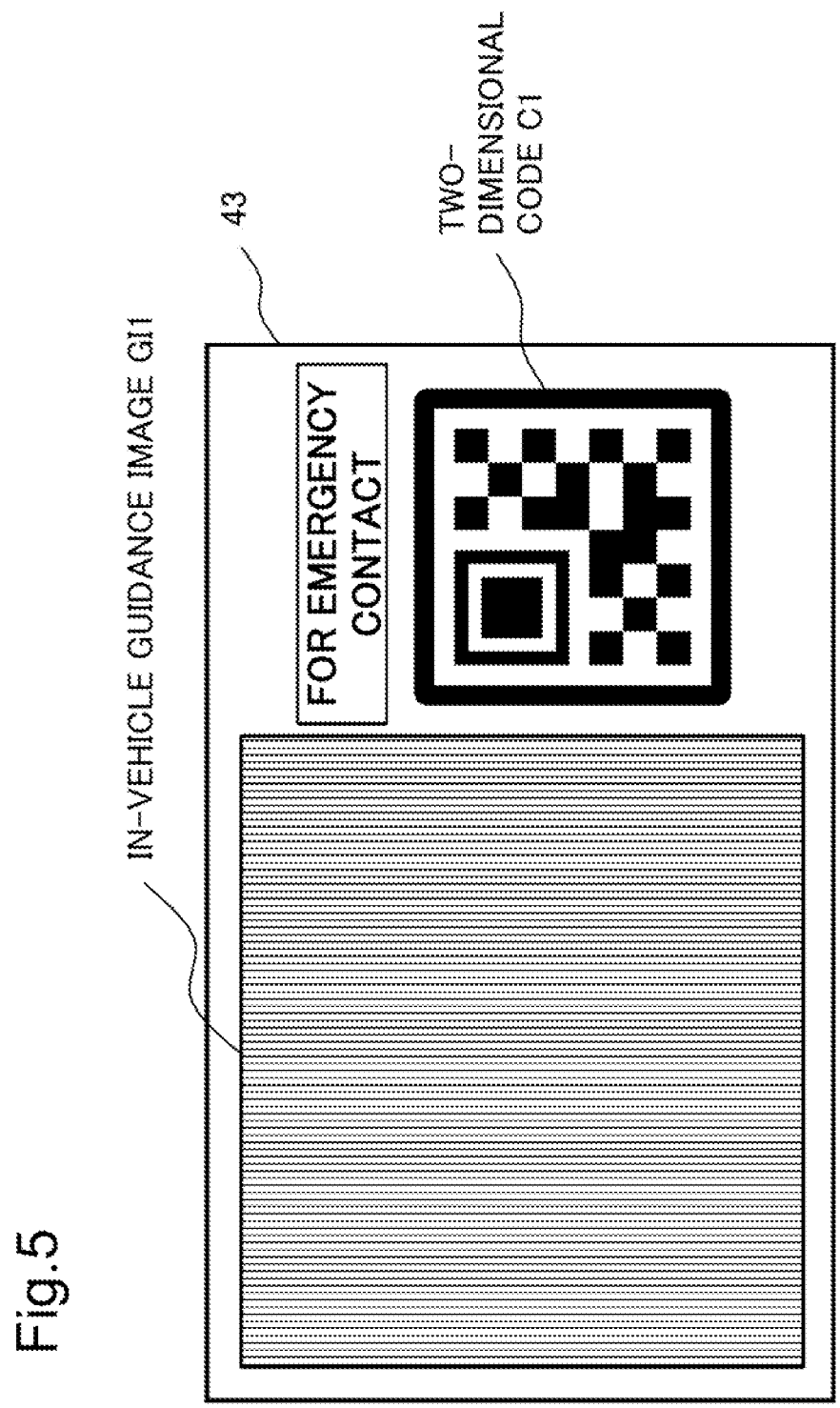
FIG. 5 is a diagram illustrating an example of an image displayed on a display unit of a display device according to the first example embodiment of the present invention.

The display device 4 is installed in the train. The display device 4 displays an image including a two-dimensional code on the display unit 43. FIGS. 3 to 5 are diagrams each illustrating an example of an image displayed on the display unit 43 of the display device 4. As illustrated in FIGS. 3 to 5, the display device 4 displays an image including a two-dimensional code C1 on the display unit 43.

Next, the management device 3, the display control device 1, and the display device 4 will be described in detail with reference to FIGS. 1 to 7.

<Configuration of Management Device 3>

The management device 3 includes a transmission/reception unit 31 and an attendant information storage unit 32.

The transmission/reception unit 31 is an example of a transmission/reception means. The transmission/reception unit 31 reads information indicating a contact point of an attendant from the attendant information storage unit 32 at a predetermined timing.

The predetermined timing is, for example, a time and date indicated in work start date and time information. The work start date and time information indicates a date and time when an attendant starts his/her duties in each train. The transmission/reception unit 31 reads information indicating a contact point of the attendant who starts his/her duties according to the work start date and time information. The transmission/reception unit 31 transmits the read information indicating the contact point to the display control device 1. The information indicating the contact point will be described in detail below.

Alternatively, the predetermined timing may be when the management device 3 receives a request from a terminal (not illustrated) installed in the train or a terminal 6 possessed by an attendant. Specifically, for example, the terminal 6 receiving an operation performed when an attendant starts his/her duties in the train or a terminal installed in the train notifies the management device 3 of attendant identification information indicating the attendant who starts his/her duties. The attendant identification information is information capable of identifying the attendant such as a name of the attendant. The transmission/reception unit 31 specifies information indicating a contact point of the attendant indicated in the notified attendant identification information from the information indicating the contact point stored in the attendant information storage unit 32. The transmission/reception unit 31 transmits the specified information indicating the contact point to the display control device 1.

The attendant information storage unit 32 is an example of an attendant information storage means. In the attendant information storage unit 32, information indicating a contact point of an attendant and attendant identification information are stored in advance in association with each other. The attendant information storage unit 32 also stores work schedule information.

The work schedule information indicates a schedule at which an attendant will work in the train. For example, the work schedule information includes attendant identification information, train number information, work start date and time information, and work end date and time information. The train number information indicates a train number of a train in which an attendant is working. The work end date and time information indicates a date and time when the attendant ends working in the train indicated by the train number.

The information indicating the contact point indicates a contact point. For example, the contact point is a phone number of the terminal 6 carried by the attendant, a mail address of the terminal 6, a meeting code of an online meeting (e.g., a uniform resource locator (URL)), or the like. When the terminal 6 of the attendant and a terminal 5 of a passenger access the meeting code of the online meeting, the terminal 6 of the attendant and the terminal 5 of the passenger can perform the online meeting. The terminal 5 is a terminal carried by a passenger. Alternatively, for example, the information indicating the contact point is data capable of displaying a two-dimensional code indicating the contact point in a figure pattern (e.g., image data having a two-dimensional code). The two-dimensional code may be a QR code or any other type of code.

Note that the work schedule information is stored in advance in the attendant information storage unit 32 by an attendant or the like. For example, at the time of starting work, or before starting work, an attendant inputs a work schedule to the management device 3 by operating an input/output interface (not shown) of the management device 3. A storage unit (not illustrated) stores the work schedule information indicating the input work schedule in the attendant information storage unit 32. For example, the attendant is a driver, a conductor, an in-vehicle sales person, another attendant working in a train, or the like. In the present example embodiment, it is assumed that the display control device 1 transmits information for causing the display device 4 in the train to display a two-dimensional code corresponding to a contact point of an attendant, but the contact point is not limited thereto. The contact point may be a contact point of a person in charge of an operation command of the train.

<Configuration of Display Control Device 1>

The display control device 1 includes an acquisition unit 11 and a transmission unit 12.

The acquisition unit 11 acquires information indicating a contact point of an attendant in the train from the management device 3 storing the information indicating the contact point of the attendant in the train. In this example, the acquisition unit 11 acquires the information indicating the contact point by receiving it from the management device 3.

The transmission unit 12 transmits information for causing the display device 4 in the train to display a two-dimensional code based on the acquired information. The information for causing the display device 4 in the train to display a two-dimensional code may include image data on an image including the two-dimensional code. Alternatively, the information for causing the display device 4 in the train to display a two-dimensional code includes data in a certain format capable of displaying the two-dimensional code on the display unit 43 of the display device 4.

By transmitting the information for causing the display device 4 in the train to display a two-dimensional code, the transmission unit 12 displays the two-dimensional code on the display unit 43 of the display device 4 as follows.

For example, the transmission unit 12 transmits information for causing the display device 4 to display a two-dimensional code superimposed on a predetermined area of a template image. The template image is an image including a sentence and the like to be displayed together with the two-dimensional code. For example, the template image shows a sentence indicating that a call with the attendant can be made from a phone number of a two-dimensional code, a sentence prompting a read of a two-dimensional code, and the like. In this example, the template image is, for example, an image obtained by removing the two-dimensional code C1 from the image of FIG. 3. The predetermined area is an area in which the two-dimensional code is to be displayed in the template image. The transmission unit 12 of the display control device 1 may perform processing of generating an image on which the two-dimensional code is superimposed. Alternatively, a control unit 42 of the display device 4 or the central device may perform processing of generating an image on which the two-dimensional code is superimposed. In FIG. 3, an image of a two-dimensional code C1 is superimposed on a predetermined area of a template image. The image data on the template image and the information indicating the predetermined area are stored in advance in a storage unit (not illustrated) of a device that generates an image on which a two-dimensional code is superimposed (e.g., the display control device 1).

Alternatively, the transmission unit 12 may transmit information for causing the display device 4 to display an image of content or a two-dimensional code superimposed on an image for displaying in-vehicle guidance in the train. FIG. 4 is an example of an image displayed by the display unit 43 of the display device 4 when the transmission unit 12 transmits information for causing the display device 4 to display a two-dimensional code C1 superimposed on a content image CI1, which is an image of content. For example, a content distribution system distributes content information to the train. The content information is information for causing the display device 4 to display content such as news, weather forecast, traffic information, or advertisement. The in-vehicle guidance is guidance as to train operation information or the like such as train departure and arrival guidance and railroad information. An operation information distribution system (not illustrated) transmits operation information to the train. For example, the transmission unit 12 of the display control device 1, the control unit 42 of the display device 4, or the central device superimposes a two-dimensional code on the image of the content based on the content information or the image of the in-vehicle guidance. When the transmission unit 12 of the display control device 1 superimposes the two-dimensional code on the template image, the image of the content based on the content information, or the image of the in-vehicle guidance, the information for causing the display device 4 in the train to display the two-dimensional code may be the following data. The information for causing the display device 4 in the train to display the two-dimensional code may be data indicating a superimposition result. The data indicating the superimposition result is, for example, image data on an image after the two-dimensional code is superimposed thereon. Note that the transmission unit 12 may transmit information for causing the display device 4 to display an image of content or an image for displaying in-vehicle guidance in the train and a two-dimensional code.

FIG. 5 is an example of an image displayed by the display unit 43 of the display device 4 when the transmission unit 12 transmits information for causing the display device 4 to display an in-vehicle guidance image GI1, which is an image for displaying in-vehicle guidance in the train, and a two-dimensional code C1.

<Configuration of Display Device 4>

The display device 4 includes a reception unit 41, a control unit 42, and a display unit 43.

The reception unit 41 is an example of a reception means. The reception unit 41 receives information for causing the display device 4 in the train to display the two-dimensional code.

The control unit 42 is an example of a control means. The control unit 42 controls the display unit 43 to display an image corresponding to the information for causing the display device 4 in the train to display the two-dimensional code. For example, in accordance with the control by the central device, the control unit 42 controls the display unit 43 to display an image (FIG. 3 in this example) including a two-dimensional code between display of content and display of in-vehicle guidance.

The display unit 43 is an example of a display means. The display unit 43 is a display installed in the train. The display unit 43 displays an image including a two-dimensional code. Note that the display unit 43 may display an image of the two-dimensional code itself.

FIG. 6 is a schematic diagram illustrating how a passenger P1 contacts an attendant T1 when the display control system 2 is used. The attendant T1 carries a terminal 6 while working in the train. In the train where the attendant T1 works, a display unit 43-1 and a display unit 43-2 are installed above a door in the train. For example, the display unit 43-1 is used for advertisement. Furthermore, for example, the display unit 43-2 is used for in-vehicle guidance. In the example of FIG. 6, an image including a two-dimensional code C1 based on a contact point of the attendant T1 who is working is displayed on the display unit 43-2. Note that image data on the image including the two-dimensional code may be displayed on a display unit for advertisement (the display unit 43-1 in this example).

When the passenger P1 contacts the attendant T1, the passenger P1 reads the two-dimensional code displayed on the display unit 43-2 using the terminal 5. The terminal 5 includes a camera. The terminal 5 extracts a two-dimensional code from a captured image and performs decoding processing of obtaining information represented by the extracted two-dimensional code. In the terminal 5, a dedicated program for performing decoding processing and making a contact based on the obtained information may be installed in advance. The passenger P1 uses the terminal 5 to contact a contact point obtained by the terminal 5 from the two-dimensional code. In FIG. 6, how the passenger P1 contacts the attendant T1 is indicated by a broken line. For example, the passenger P1 contacts the attendant T1 to notify that a lost article has been found or that an emergency such as an emergency patient has occurred. Note that, although a case where the passenger P1 contacts the attendant T1 has been described as an example with reference to FIG. 6, in a case where two or more contact points are obtained from the two-dimensional code, the terminal 5 may contact the plurality of contact points. For example, when the terminal 5 obtains the contact point of the attendant T1 and the contact point of the person in charge of an operation command (not illustrated) from the two-dimensional code, the terminal 5 performs communication between the terminal 6 of the attendant T1 and the terminal (not illustrated) of the person in charge of an operation command using a voice or an image (e.g., a moving image). The terminal 6 of the attendant T1 may be able to disconnect the communication with the terminal of the person in charge of an operation command according to an operation of the attendant T1. The person in charge of an operation command manages an operation of the train in charge.

When the terminal 5 reads the two-dimensional code, the terminal 5 may notify the terminal 6 of a request for contact. The terminal 6 notified of the request for contact notifies the terminal 5 of permission for communication between the terminal 6 and the terminal 5 according to an operation of the attendant T1. Thereafter, the terminal 6 may start communication with the terminal 5. When notifying the terminal 6 of the request for contact, the terminal 5 may notify the terminal 6 of other information obtained from the two-dimensional code. For example, the other information is information specifying a vehicle such as a vehicle number of a vehicle in which the display device 4 is installed, information indicating a train number, or installation location information that is information indicating a location where the display device 4 is installed in the train. For example, the installation location information includes information indicating a number of a compartment of the train in which the display device 4 is installed and information indicating a number of a door closest to the installation location of the display device 4. The terminal 5 may have a position measurement function to measure a position of the terminal 5, and notify the terminal 6 of position information indicating the measured position.

Note that, in a case where a phone number is obtained from the two-dimensional code, the terminal 5 may activate a call function so that a call can be made to the phone number. The terminal 5 may start an online meeting with a meeting code for the online meeting read from the two-dimensional code. When the terminal 5 reads a plurality of types of contact points from the two-dimensional code including information on the plurality of types of contact points, the terminal 5 may display a user interface (UI) on the display unit of the terminal 5 for the passenger to select a function to be activated for contact. For example, when the terminal 5 reads a phone number and a mail address from the two-dimensional code, the terminal 5 displays a UI for the passenger P1 to select whether to activate a call function or activate a mailer on the display unit of the terminal 5.

In addition, the two-dimensional code displayed on the display unit 43 of the display device 4 may include information for causing the terminal 5 that has read the two-dimensional code to activate a mailer and create a mail. For example, the terminal 5 that has read the two-dimensional code creates a mail in which the mail address of the terminal 6 of the attendant T1 is input as a destination to which the mail is transmitted and the template of the notification is input as text of the mail based on the information obtained from the two-dimensional code. The passenger P1 edits the text of the mail created by the terminal 5 and transmits, to the terminal 6, the mail containing the contents for notifying the emergency. In this manner, the passenger P1 can easily notify the attendant T1 of an occurrence of an emergency and a situation of the emergency.

As described above, the display control device 1 according to the present example embodiment acquires information indicating a contact point of an attendant in the train from the management device 3 storing the information indicating the contact point of the attendant in the train. The display control device 1 transmits information for causing the display device 4 in the train to display a two-dimensional code based on the acquired information. As a result, it is possible to cause the display device 4 to display a two-dimensional code corresponding to a change in contact point.

<Operation>

Figure 7:
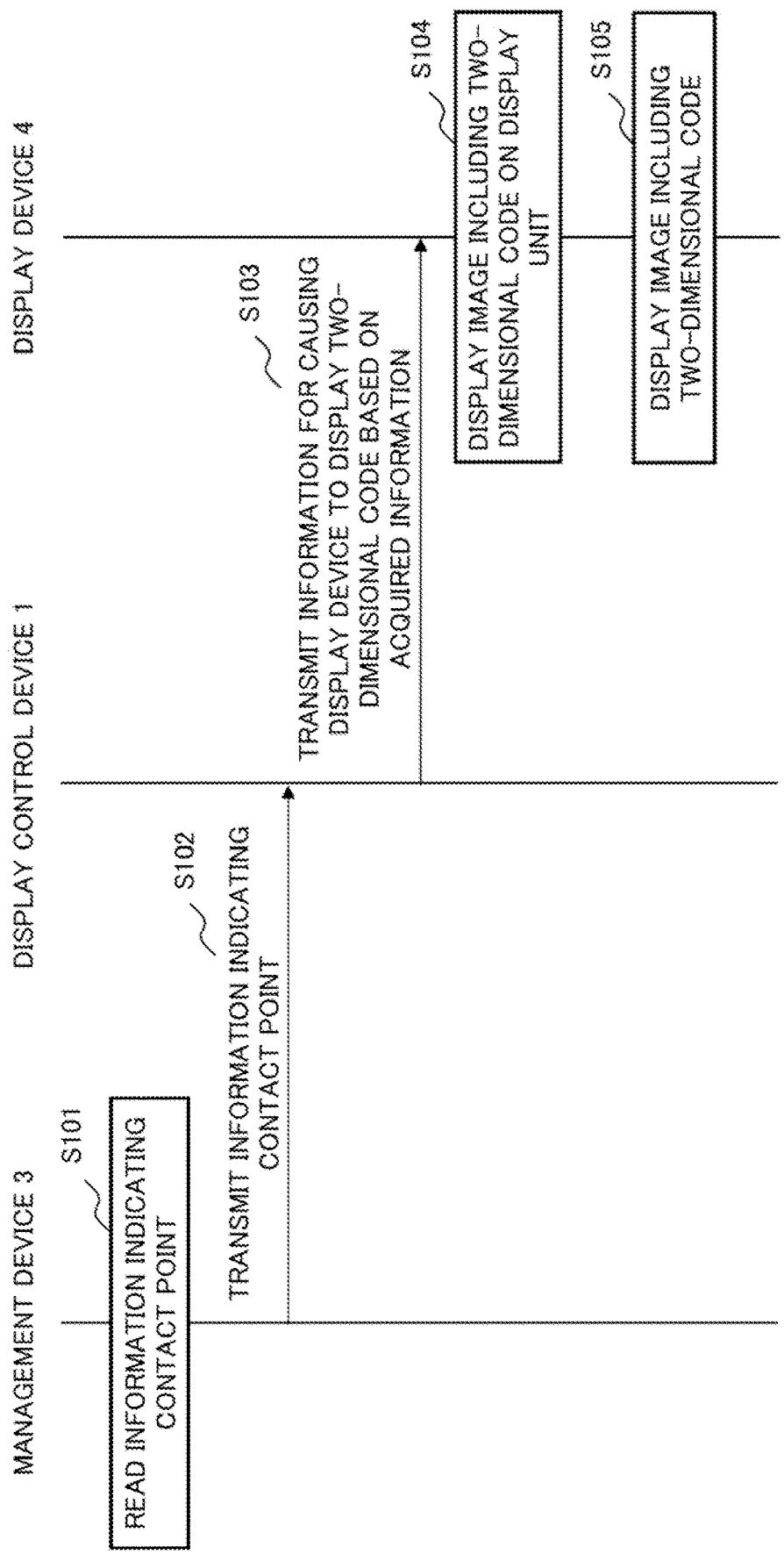
FIG. 7 is a sequence diagram illustrating an example of an operation of the display control system according to the first example embodiment of the present invention.

Next, an operation of an example of the display control system 2 according to the present example embodiment will be described with reference to FIG. 7. FIG. 7 is a sequence diagram illustrating an operation of an example of the display control system 2.

The transmission/reception unit 31 of the management device 3 reads information indicating a contact point of an attendant from the attendant information storage unit 32 at a predetermined timing (step S101). The transmission/reception unit 31 transmits the read information indicating the contact point to the display control device 1 (step S102).

The acquisition unit 11 of the display control device 1 acquires the information indicating the contact point by receiving it from the management device 3.

The transmission unit 12 transmits information for causing the display device 4 in the train to display a two-dimensional code based on the acquired information (step S103).

The information for causing the display device 4 in the train to display a two-dimensional code will be described in detail.

For example, the transmission unit 12 transmits information for causing the display device 4 to display a two-dimensional code based on a location where the display device 4 is installed. The information for causing the display device 4 in the train to display a two-dimensional code includes display device identification information indicating a display device 4 located at a display destination. The two-dimensional code displayed on the display unit 43 of the display device 4 includes information for making a call by adding a number corresponding to a location where the display device 4 is installed to the phone number of the terminal 5 that has read the two-dimensional code. For example, the information indicating the place where the display device 4 is installed includes information indicating a number of a compartment of the train in which the display device 4 is installed and information indicating a door number. When the passenger makes a call to the attendant using the terminal 5 that has read the two-dimensional code, the terminal 6 of the attendant receives the call from the phone number of the terminal 5 of the passenger to which the compartment number and the door number obtained by the terminal 5 from the two-dimensional code are added. As a result, even if the phone number is an unknown, the attendant can recognize that the call has been made from the terminal 5 of the passenger. In addition, the attendant can grasp the place where the passenger has read the two-dimensional code from the compartment number and the door number added to the phone number calling the terminal 6. Note that installation location information, which is information indicating a location where the display device 4 is installed in the train, and display device identification information about the display device 4 are stored in advance in association with each other in a storage unit (not illustrated). The display device identification information is information capable of identifying the display device 4.

Alternatively, for example, in a case where the display device 4 is installed for each seat of the train, the transmission unit 12 transmits information for causing the display device 4 to display a two-dimensional code including information for specifying the seat. The information for causing the display device 4 in the train to display a two-dimensional code includes display device identification information indicating a display device 4 located at a display destination for displaying the two-dimensional code. Specifically, in a case where the display device 4 is installed to face each seat of the train, information indicating a seat located at a position facing the display device 4 may be included in the two-dimensional code. A passenger seated on the seat can read the two-dimensional code displayed on the display device 4. When the passenger contacts a contact point obtained from the two-dimensional code by using the terminal 5, the terminal 5 notifies the contact point of information indicating the seat obtained from the two-dimensional code. Note that the display control system 2 may be used for an in-vehicle sales service. Specifically, when the information for specifying the seat is included in the two-dimensional code, the terminal 5 notifies the contact point of the information for specifying the seat. As a result, an in-vehicle sales person as a contact point can grasp the seat of the passenger who desires in-vehicle sales. In addition, when the terminal of the in-vehicle sales person receives an order from the terminal 5, the in-vehicle sales person can carry the ordered article to the grasped passenger's seat.

The reception unit 41 of the display device 4 receives information for causing the display device 4 in the train to display the two-dimensional code. The control unit 42 controls the display unit 43 to display an image including the two-dimensional code according to the information for causing the display device 4 in the train to display the two-dimensional code (step S104).

The display unit 43 displays the image including the two-dimensional code (step S105).

Note that the transmission/reception unit 31 of the management device 3 may read a train number in step S101. In step S102, the transmission/reception unit 31 may transmit the train number and the information indicating the contact point to the display control device 1 in association with each other. For example, in step S103, the transmission unit 12 of the display control device 1 transmits information for causing the display device 4 in the train to display a two-dimensional code further including the information indicating the train number. In a case where the information indicating the train number of the train where the display device 4 is installed is stored in a storage unit (not illustrated) in advance, the control unit 42 performs the operation of step S104 when the train number stored in the storage unit matches the received train number. Alternatively, in step S103, the transmission unit 12 of the display control device 1 may specify, from the train number, a destination to which the information for causing the display device 4 in the train to display a two-dimensional code is to be transmitted. The transmission destination is, for example, a central device of a train indicated by the train number.

In step S103, the transmission unit 12 may transmit information for causing the display device 4 to display a two-dimensional code that can be used as many as a predetermined number of times in a predetermined period of time. As a result, it is possible to suppress a nuisance act by a passenger who contacts the attendant multiple times using the two-dimensional code even though the situation is not an emergency.

As described above, the display control device 1 acquires information indicating a contact point of an attendant in the train. The display control device 1 transmits information for causing the display device 4 in the train to display a two-dimensional code based on the acquired information. As a result, it is possible to cause the display device 4 to display a two-dimensional code corresponding to a change in contact point.

The display control device 1 enables a passenger to directly contact the attendant by call or email or through an online meeting, so that the passenger can contact the attendant at any location. The passenger can notify the attendant of an occurrence of an emergency or a situation the emergency while evacuating from a fire or accident site. In addition, the passenger can transmit an image to the terminal 6 of the attendant using a camera function of the terminal 5. The attendant can grasp the situation of the emergency from the image captured by the terminal 5. In addition, even when it is difficult for the passenger to explain the situation regarding the emergency, the attendant can grasp the situation in the train from the image captured by the terminal 5 of the passenger.

In addition, the display control device 1 acquires information indicating a contact point of an attendant in the train. The display control device 1 transmits information for causing the display device 4 in the train to display a two-dimensional code based on the acquired information. As a result, the two-dimensional code including the information indicating the contact point of the attendant who is working in the train is displayed on the display unit 43 of the display device 4 in the train. In an express train operated by a plurality of railway operators, it is general that an attendant changes at a timing when the railway operator changes. Also in a train that operates for a long distance, an attendant, an operation center, and a person in charge of an operation command change during operation at a predetermined timing. When the attendant who has worked until then in the train in operation is replaced with another attendant, the display control device 1 can cause the display device 4 in the train to display a two-dimensional code including information on a contact point of the newly working attendant. As described above, even when an attendant working in the train changes during the operation of the train, such as when the train enters a route of another company, the two-dimensional code including the information on the contact point of the attendant who is working can be displayed on the display device 4 in the train. When the operation center also changes at a timing when the railway company changes, a two-dimensional code may be displayed on the display device 4 in the train corresponding to a change in contact point of a person in charge of an operation command like the change in attendant.

The display control device 1 transmits information for causing the display device 4 in the train to display a two-dimensional code. The display control device 1 enables a notification to a passenger using a digital signage in the train. As a result, it is possible to increase the number of locations where notification can be performed in the train without incurring a cost for introducing a facility for newly installing an in-vehicle notification device in the train.

Modification of First Example Embodiment

Figure 8:
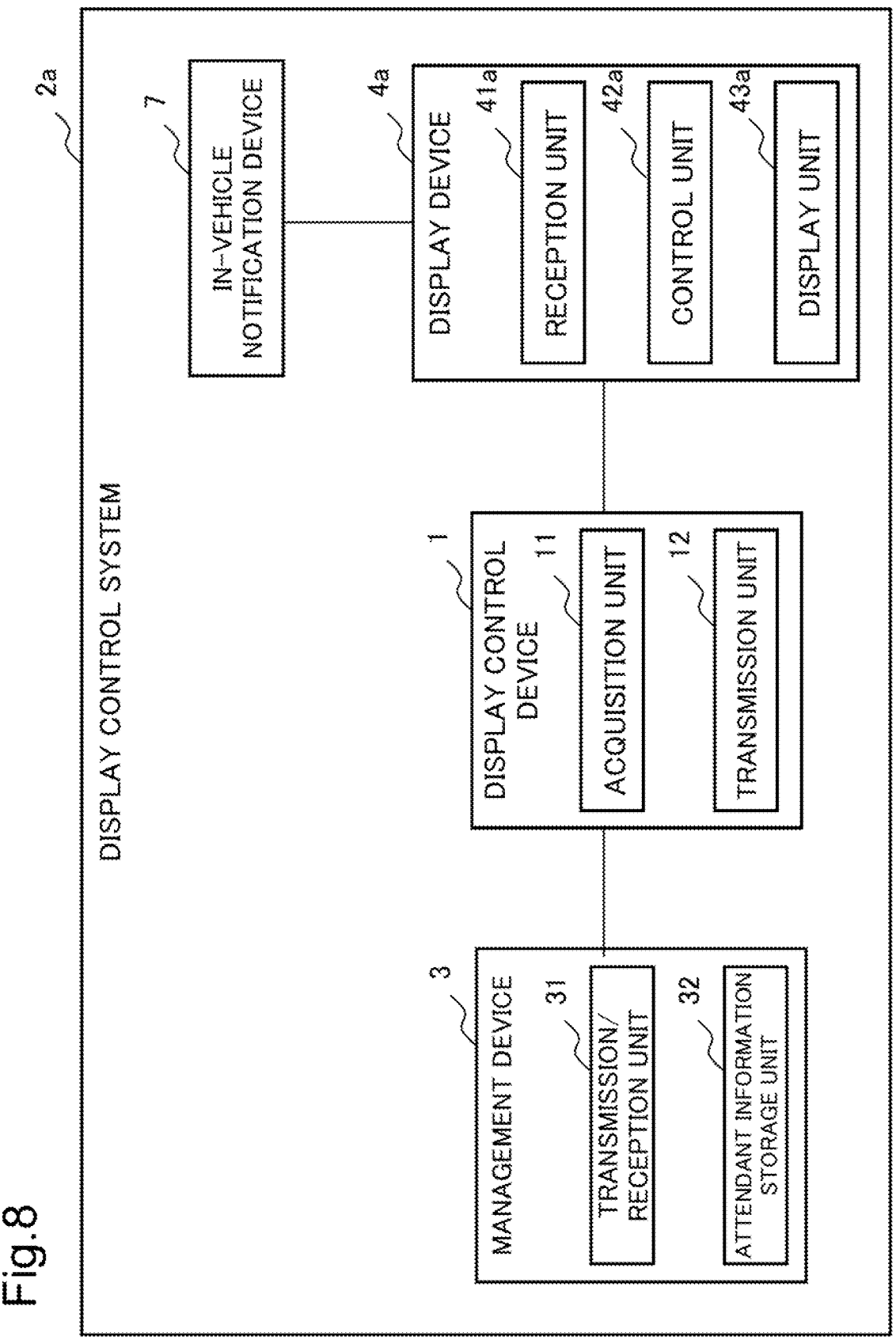
FIG. 8 is a block diagram illustrating an example of a configuration of a display control system according to a modification of the first example embodiment of the present invention.

A display control system 2a according to the present modification is different from the display control system 2 according to the first example embodiment in that the display control system 2a includes an in-vehicle notification device 7. FIG. 8 is a block diagram illustrating an example of a configuration of the display control system 2a according to the modification of the first example embodiment.

The configurations and operations of the management device 3 and the display control device 1 according to the present modification are similar to those of the management device 3 and the display control device 1 according to the first example embodiment, and thus, description thereof is omitted.

The in-vehicle notification device 7 includes an emergency button (not illustrated) to be pressed by a passenger when an emergency occurs in the train. When the passenger presses the emergency button, the in-vehicle notification device 7 notifies a display device 4a that the emergency has occurred.

The reception unit 41a of the display device 4a receives information for causing the display device 4a in the train to display a two-dimensional code. The reception unit 41a stores the information for causing the display device 4a in the train to display a two-dimensional code in a storage unit (not illustrated). When notified of the occurrence of the emergency from the in-vehicle notification device 7, the reception unit 41a requests a control unit 42a to perform control of display.

When the control of the display is requested from the reception unit 41a, the control unit 42a reads information for causing the display device 4 in the train to display a two-dimensional code from the storage unit. The control unit 42a controls the display unit 43a to display an image including the two-dimensional code according to the information for causing the display device 4a in the train to display the two-dimensional code.

The display device 4a according to the present modification displays normal in-vehicle guidance and content on the display unit 43a when no emergency has occurred, and displays a two-dimensional code used for contacting an attendant on the display unit 43a when an emergency has occurred. As a result, when an emergency occurs, the passenger can notify that the emergency has occurred at a certain place using a two-dimensional code used for contacting the attendant, while the display of normal in-vehicle guidance and content is not reduced when no emergency occurs.

Second Example Embodiment

Figure 9:
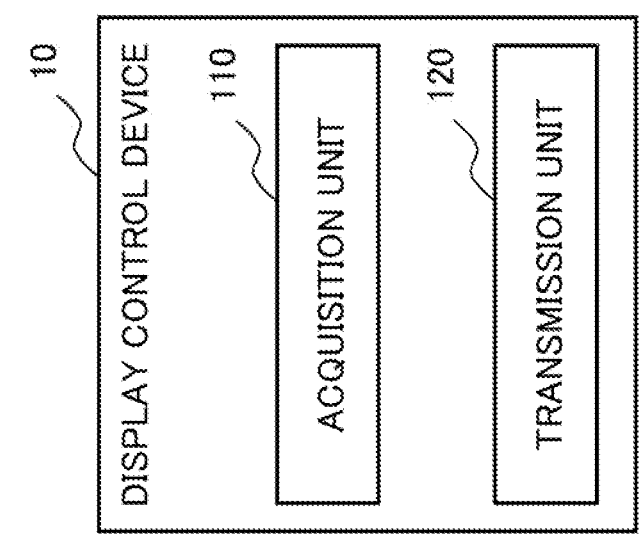
FIG. 9 is a block diagram illustrating an example of a configuration of a display control device according to a second example embodiment of the present invention.

A second example embodiment of the present invention will be described. FIG. 9 is a block diagram illustrating an example of a configuration of a display control device 10 according to the present example embodiment. The display control device 10 according to the present example embodiment includes an acquisition unit 110 and a transmission unit 120.

The acquisition unit 110 is an example of an acquisition means. The acquisition unit 110 acquires information indicating a contact point of an attendant in the train from a management device (not illustrated) storing the information indicating the contact point of the attendant in the train.

The transmission unit 120 is an example of a transmission means. The transmission unit 120 transmits information for causing a display device (not illustrated) in the train to display a two-dimensional code based on the acquired information. For example, the transmission destination is the display device or a central device (not illustrated) of the train. The central device controls the display of the display device installed in the train.

As described above, the display control device 10 according to the present example embodiment acquires information indicating a contact point of an attendant in the train from the management device storing the information indicating the contact point of the attendant in the train. The display control device 10 transmits information for causing the display device in the train to display a two-dimensional code based on the acquired information. As a result, it is possible to cause the display device to display a two-dimensional code corresponding to a change in contact point.

Figure 10:
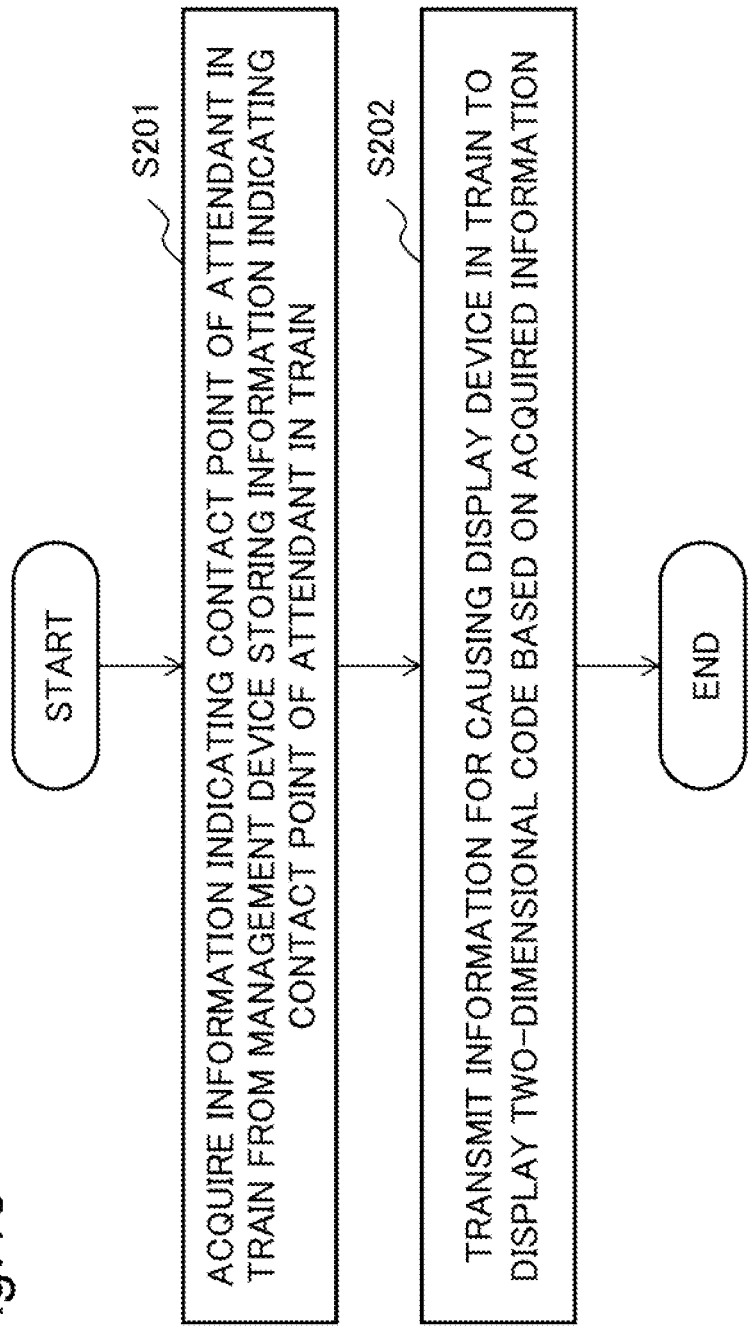
FIG. 10 is a flowchart illustrating an example of an operation of the display control device according to a second example embodiment of the present invention.

Next, an operation of an example of the display control device 10 according to the present example embodiment will be described with reference to FIG. 10. FIG. 10 is a flowchart illustrating an example of an operation of the display control device 10.

The acquisition unit 110 acquires information indicating a contact point of an attendant in the train from the management device storing the information indicating the contact point of the attendant in the train (step S201).

The transmission unit 120 transmits information for causing the display device in the train to display a two-dimensional code based on the acquired information (step S202).

By operating as described above, the display control device 10 can enable the display device to display a two-dimensional code corresponding to a change in contact point.

Example of Hardware Configuration

The procedure described in the above example embodiment can be implemented by a display control program for causing an information processing device (computer) functioning as a display control device to implement a functions as such a device.

An example of a configuration of hardware resources for implementing each of the display control devices (1, 10) in the above-described example embodiments of the present invention using one information processing device (computer) will be described. Note that the display control device may be implemented physically or functionally using at least two information processing devices. In addition, the display control device may be implemented as a dedicated device. In addition, only some functions of the display control device may be implemented using the information processing device.

Figure 11:
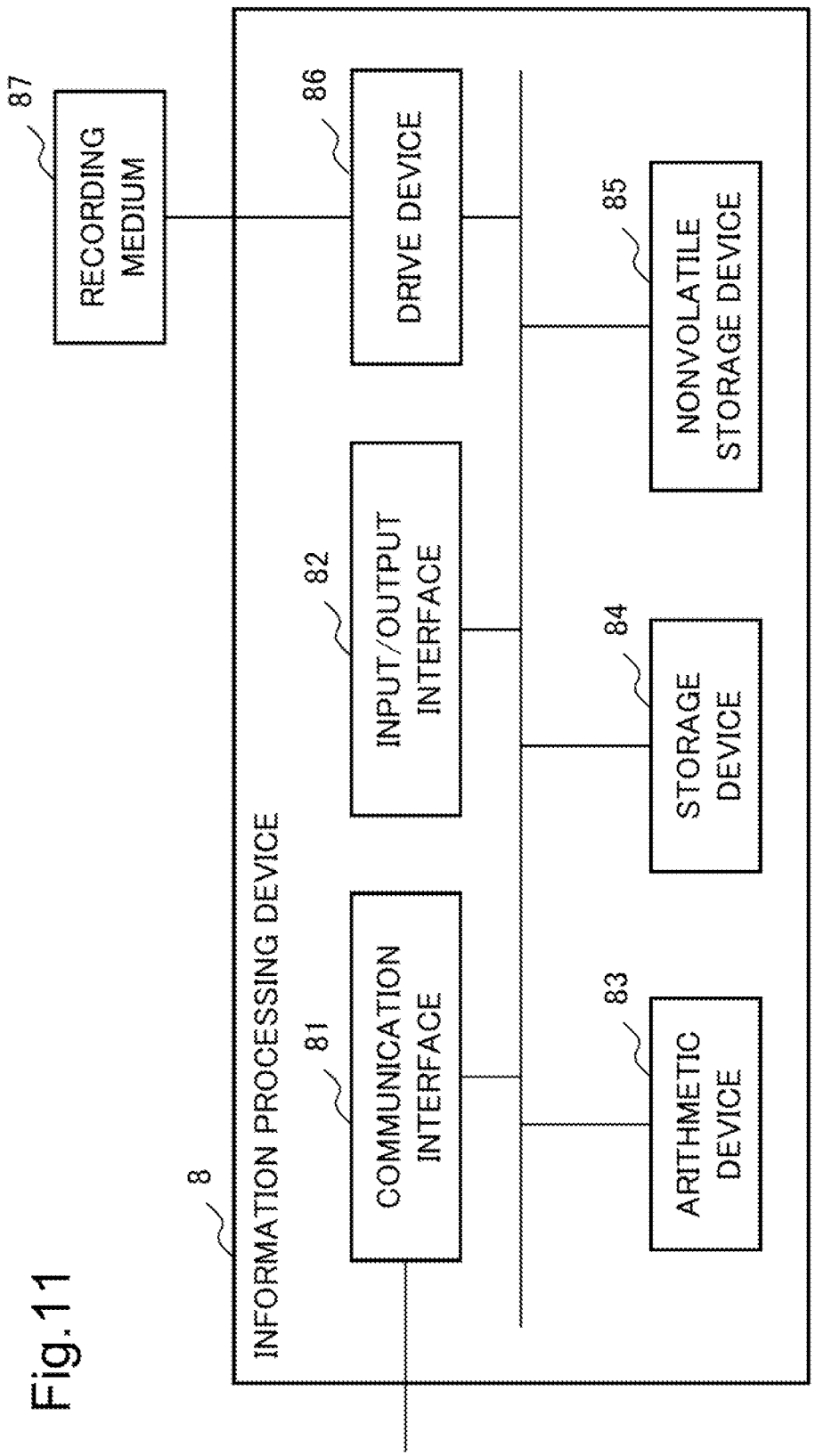
FIG. 11 is a diagram illustrating an example of a hardware configuration according to an example embodiment of the present invention.

FIG. 11 is a diagram schematically illustrating an example of a hardware configuration of an information processing device capable of implementing the display control device according to each example embodiment of the present invention. The information processing device 8 includes a communication interface 81, an input/output interface 82, an arithmetic device 83, a storage device 84, a nonvolatile storage device 85, and a drive device 86.

For example, the acquisition unit 110 and the transmission unit 120 of the display control device 10 in FIG. 9 can be implemented by the communication interface 81 and the arithmetic device 83.

The communication interface 81 is a communication means for the display control device according to each example embodiment to communicate with an external device in a wired or/and wireless manner. Note that, in a case where the display control device is implemented using at least two information processing devices, these devices may be connected to be able to communicate with each other via the communication interface 81.

The input/output interface 82 is a man-machine interface such as a keyboard as an example of an input device or a display as an output device.

The arithmetic device 83 is implemented by a general-purpose central processing unit (CPU), an arithmetic processing device such as a microprocessor, or a plurality of electric circuits. For example, the arithmetic device 83 can read various programs stored in the nonvolatile storage device 85 into the storage device 84, and execute processing according to the read program.

The storage device 84, which is a memory device such as a random access memory (RAM) that can be referred to from the arithmetic device 83, stores programs, various types of data, and the like. The storage device 84 may be a volatile memory device.

The nonvolatile storage device 85 is a nonvolatile storage device such as a read only memory (ROM) or a flash memory, and can store various programs, data, and the like.

The drive device 86 is, for example, a device that reads and writes data from and to a recording medium 87 to be described below.

The recording medium 87 is any recording medium capable of recording data, for example, an optical disk, a magneto-optical disk, a semiconductor flash memory, or the like.

In the example embodiment of the present invention, the display control device may be constituted, for example, by the information processing device 8 illustrated in FIG. 11. Then, the example embodiment of the present invention may be implemented by supplying the program capable of implementing the function described in the above example embodiment to the display control device.

In this case, the arithmetic device 83 can implement the example embodiment by executing the program supplied to the display control device. In addition, not all but some of the functions of the display control device can be configured by the information processing device 8.

Furthermore, the program may be recorded in the recording medium 87, and the display control device may be configured such that the program is appropriately stored in the nonvolatile storage device 85 at a shipment stage, an operation stage, or the like of the display control device. In this case, as a method of supplying the program, a method of installing the program in the display control device using an appropriate jig may be adopted in a manufacturing stage before shipment, an operation stage, or the like. In addition, as a method of supplying the program, a general procedure such as a method of downloading the program from the outside via a communication line such as the Internet may be adopted.

In relation to the example embodiments described above, JP 2015-144381 A and JP 2020-116990 A describe a method of displaying a QR code including a communication destination on a display. However, in JP 2015-144381 A and JP 2020-116990 A, a contact point obtained by a mobile terminal from a two-dimensional code is an information center or an administrator of a vehicle, and is determined in advance. On the other hand, it is general in a train that an attendant who is working in the train changes according to an attendant's working schedule, and accordingly, a contact point also changes. In the methods described in JP 2015-144381 A and JP 2020-116990 A, it is not possible to display a two-dimensional code corresponding to the change in contact point on the display device.

An example advantage according to the invention is to display a two-dimensional code corresponding to a change in contact point on the display device.

Each of the above-described example embodiments is a preferred example embodiment of the present invention, and various modifications can be made without departing from the gist of the present invention.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A display control device comprising:
one or more memories storing instructions; and
one or more processors configured to execute the instructions to:
acquire information indicating a contact point of an attendant in a train from a management device storing the information indicating the contact point of the attendant in the train;
transmit information for causing a display device in the train to display a two-dimensional code based on the acquired information; and
transmit the information for causing the display device to display the two-dimensional code based on a location where the display device is installed,
wherein the two-dimensional code includes information for making a call by adding a number corresponding to the location to a phone number of a terminal that has read the two-dimensional code.

2. A display control system comprising:
a management device including an attendant information storage configured to store information indicating a contact point of an attendant in a train;
the display control device according to claim 1; and
a display device including a display configured to display an image including the two-dimensional code.

3. A display control method comprising:
acquiring information indicating a contact point of an attendant in a train from a management device storing the information indicating the contact point of the attendant in the train;
transmitting information for causing a display device in the train to display a two-dimensional code based on the acquired information; and
transmitting the information for causing the display device to display the two-dimensional code based on a location where the display device is installed,
wherein the two-dimensional code includes information for making a call by adding a number corresponding to the location to a phone number of a terminal that has read the two-dimensional code.

4. The display control method according to claim 3, further comprising:

displaying, by the display device including a display, an image including the two-dimensional code, wherein the information indicating the contact point of the attendant in the train is stored in an attendant information storage included in the management device.

5. A non-transitory computer-readable recording medium having recorded thereon a display control program for causing a computer to execute:

acquiring information indicating a contact point of an attendant in a train from a management device storing the information indicating the contact point of the attendant in the train;

transmitting information for causing a display device in the train to display a two-dimensional code based on the acquired information; and transmitting the information for causing the display device to display the two-dimensional code based on a location where the display device is installed, wherein the two-dimensional code includes information for making a call by adding a number corresponding to the location to a phone number of a terminal that has read the two dimensional code.

\* \* \* \* \*